United States Patent
Chaudhuri et al.

(10) Patent No.: US 10,057,915 B2
(45) Date of Patent: Aug. 21, 2018

(54) METHODS AND SYSTEMS FOR ADAPTIVE SCHEDULING OF PACKETS IN A WIRELESS BROADBAND NETWORK

(71) Applicant: Wipro Limited, Bangalore (IN)

(72) Inventors: Saptarshi Chaudhuri, Bangalore (IN); Avijit Manna, Kolkata (IN); Amartya Kumar Das, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 252 days.

(21) Appl. No.: 15/086,820

(22) Filed: Mar. 31, 2016

(65) Prior Publication Data
US 2017/0265215 A1   Sep. 14, 2017

(30) Foreign Application Priority Data
Mar. 11, 2016   (IN) .............................. 201641008612

(51) Int. Cl.
*H04W 72/12*   (2009.01)
*H04L 1/00*   (2006.01)
(Continued)

(52) U.S. Cl.
CPC ....... *H04W 72/1247* (2013.01); *H04L 1/0018* (2013.01); *H04L 12/4625* (2013.01);
(Continued)

(58) Field of Classification Search
None
See application file for complete search history.

(56) References Cited

U.S. PATENT DOCUMENTS

| 8,737,205 B2 | 5/2014 | Ma |
| 2002/0080508 A1 | 6/2002 | Leung |

(Continued)

FOREIGN PATENT DOCUMENTS

| EP | 2 442 503 A1 | 4/2012 | |
| WO | WO 2007/058508 A1 | 5/2007 | |
| WO | WO-2007058508 A1 * | 5/2007 | ........ H04W 72/1236 |

OTHER PUBLICATIONS

Extended European Search Report issued by the European Patent Office in corresponding European Application No. 16176919.5-1857, dated Jul. 28, 2016.

(Continued)

*Primary Examiner* — Rebecca E Song
(74) *Attorney, Agent, or Firm* — Finnegan, Henderson, Farabow, Garrett & Dunner LLP

(57) ABSTRACT

Method and systems for adaptive scheduling of packets in a wireless broadband network are disclosed. In one embodiment, the method comprises receiving the packets from applications. The method further comprises analyzing the packets to obtain one or more packet parameters. The method further comprises determining a Dynamic-Packet-Level-Priority (DPLP) value for each of the packets based on the one or more packet parameters. The method further comprises placing each of the packets in priority queues based on the DPLP value. The method further comprises scheduling the packets present in the priority queues based on scheduling parameters and the DPLP value. The method further comprises performing dynamic configuration adaptation for the packet parameters, scheduling parameters and the DPLP value.

21 Claims, 4 Drawing Sheets

(51) Int. Cl.
  H04L 12/26    (2006.01)
  H04L 29/06    (2006.01)
  H04W 28/02    (2009.01)
  H04W 28/14    (2009.01)
  H04L 12/46    (2006.01)
  H04L 12/70    (2013.01)

(52) U.S. Cl.
  CPC .............. *H04L 43/16* (2013.01); *H04L 69/22* (2013.01); *H04W 28/0268* (2013.01); *H04W 28/14* (2013.01); *H04W 72/1242* (2013.01); H04L 2012/5651 (2013.01)

(56) References Cited

U.S. PATENT DOCUMENTS

| | | | |
|---|---|---|---|
| 2002/0080808 A1* | 6/2002 | Leung | H04L 12/4641 370/412 |
| 2004/0258070 A1* | 12/2004 | Arima | H04L 1/0018 370/395.4 |
| 2014/0233439 A1 | 8/2014 | Hong et al. | |
| 2014/0233479 A1* | 8/2014 | Dahod | H04W 72/044 370/329 |

OTHER PUBLICATIONS

Extended European Search Report issued in counterpart European Application No. 16 17 6919, dated Jul. 28, 2016, (8 pages).

Fujitsu Network Communications, Inc., "The Benefits of Cloud-RAN Architecture in Mobile Network Expansion", pp. 1-7 (2014). Retrieved from http://www.fujitsu.com/downloads/TEL/inc/whitepapers/CloudRANwp.pdf.

Siomina, I., et al., "Analysis of Cell Load Coupling for LTE Network Planning and Optimization", pp. 1-22, (2012). Retrieved from http://www.arxiv.org/pdf/120.4116.pdf.

"Openflow 90 minutes", Indiana Center for Network Translational Research and Education the research arm of GlobalNOC (51 pages). Retrieved from http://www.nanog.org/meetings/nanog57/presentations/Monday/mon.tutorial.SmallWallace.OpenFlow.24.pdf.

"OVS Configuration Guide", PICA8 Open Networking, Mar. 2014 (37 pages). Retrieved from http://www.pica8.com/document/picos-2.2-ovs-configuration-guide.pdf.

Technical Specification, "$3^{rd}$ Generation Partnership Project; Technical Specification Group Services and System Aspects, Policy and charging control architecture (Release 10)", 3GPP TS 23.203 V10.10.0, 131 pages (Dec. 2014).

Technical Specification, "$3^{rd}$ Generation Partnership Project, Technical Specification Group Radio Access Network: Evolved Universal Terrestrial Radio Access (E-UTRA); Radio Resource Control (RRC); Protocol specification (Release 10)", 3GPP TS 36.331, V10.19.0, 314 pages (Dec. 2015).

Yang, X., "Think through when designing a C-RAN solution", Global RAN Strategies, NEC Europe Ltd., Sep. 24, 2015. Retrieved from http://www.cambridgewireless.co.uk/Presentations/SC-24.09.15-Xinjie_Yang-NEC.pdf.

Emmerich, P., et al., "Performance Characteristics of Virtual Switching", 2014 IEEE $3^{rd}$ International Conference on Cloud Networking (CloudNet). Retrieved from http://www.net.in.turn.de/fileadmin/bibtex/publications/papers/Open-vSwitch-(2014).

* cited by examiner

METHODS AND SYSTEMS FOR ADAPTIVE SCHEDULING OF PACKETS IN A WIRELESS BROADBAND NETWORK

TECHNICAL FIELD

This disclosure relates generally to wireless communication systems, and more particularly to methods and systems for adapative scheduling of packets in a wireless broadband network.

BACKGROUND

Mobile data transmission is continuously increasing with use of smart phone and tablets. Therefore, to meet the users demand, network operators have to increase the network capacity and to scale the mobile data network effectively. However, traditional cellular systems may have some limitations in its architecture. Such limitations may include scalability issue under dynamic load conditions, fault tolerance, and utilization issues. Typically, a base station (BS) has dynamic load as the number of user equipment (UEs) in a coverage area is dynamic and the service use by such UEs is also dynamic. So, the base station (BS)/Baseband Unit (BBU) need to have capability to handle maximum load. Over a longer period of time this maximum load also keeps increasing with the increase in subscriber base and increased number of connected devices. Further, if a BBU goes down, the coverage gets affected. It is not a cost effective solution to have additional physical BBU as a backup always. Further, due to dynamic load, at any moment, some of the BBU may be overloaded and the rest may be relatively idle leading to imbalance in resource (computing, network) usage. This could lead to a lot of waste of processing resources and waste of powers at idle times.

In order to overcome the continuous scalability issue, one option is to move the computation intensive portion of the BBU, inter-BBU communication and backhaul onto Cloud platform, such as Cloud-Radio Access Network (Cloud-RAN or C-RAN). For adaptive network scaling and efficient resource utilization under dynamic load conditions, network virtualization and reuse of network resource is essential. However, scheduling of packets in the C-RAN is not effective as the packets are scheduled on predefined priorities assigned to them.

SUMMARY

Embodiments of the present disclosure present technological improvements as solutions to one or more of the above-mentioned technical problems recognized by the inventors in conventional systems. For example, in one embodiment, a system is disclosed for adapative scheduling of packets in a wireless broadband network, comprising a hardware processor and a memory storing instructions executable by the hardware processor for performing operations comprising receiving the packets from applications. The operations further comprise analyzing the packets to obtain one or more packet parameters. The operations further comprise determining a Dynamic-Packet-Level-Priority (DPLP) value for each of the packets based on the one or more packet parameters. The operations further comprise placing each of the packets in priority queues based on the DPLP value. The operations further comprise scheduling the packets present in the priority queues based on scheduling parameters and the DPLP value.

In another embodiment, a method is disclosed for adapative scheduling of packets in a wireless broadband network. The method comprises receiving the packets from applications. The method further comprises analyzing the packets to obtain one or more packet parameters. The method further comprises determining a Dynamic-Packet-Level-Priority (DPLP) value for each of the packets based on the one or more packet parameters. The method further comprises placing each of the packets in priority queues based on the DPLP value. The method further comprises scheduling the packets present in the priority queues based on scheduling parameters and the DPLP value.

In yet another embodiment, a non-transitory computer-readable medium is disclosed storing processor-executable instructions for adaptive scheduling of packets in a wireless broadband network, the instructions comprising instructions for performing operations comprising receiving the packets from applications. The operations further comprise analyzing the packets to obtain one or more packet parameters. The operations further comprise determining a Dynamic-Packet-Level-Priority (DPLP) value for each of the packets based on the one or more packet parameters. The operations further comprise placing each of the packets in priority queues based on the DPLP value. The operations further comprise scheduling the packets present in the priority queues based on scheduling parameters and the DPLP value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Typically, in a Cloud-RAN architecture, multiple Remote Radio Heads (RRHs) are connected to a centralized baseband unit (C-BBU). The C-BBU performs the centralized signal processing functionality of the RAN and RRH which is connected remotely includes the antenna.

Embodiments of present subject matter discloses a system and method for adaptive packet scheduling at the C-BBU in a wireless C-RAN (Cloud-RAN) for supporting scalability, load-sharing and better resource utilization.

Figure 1:
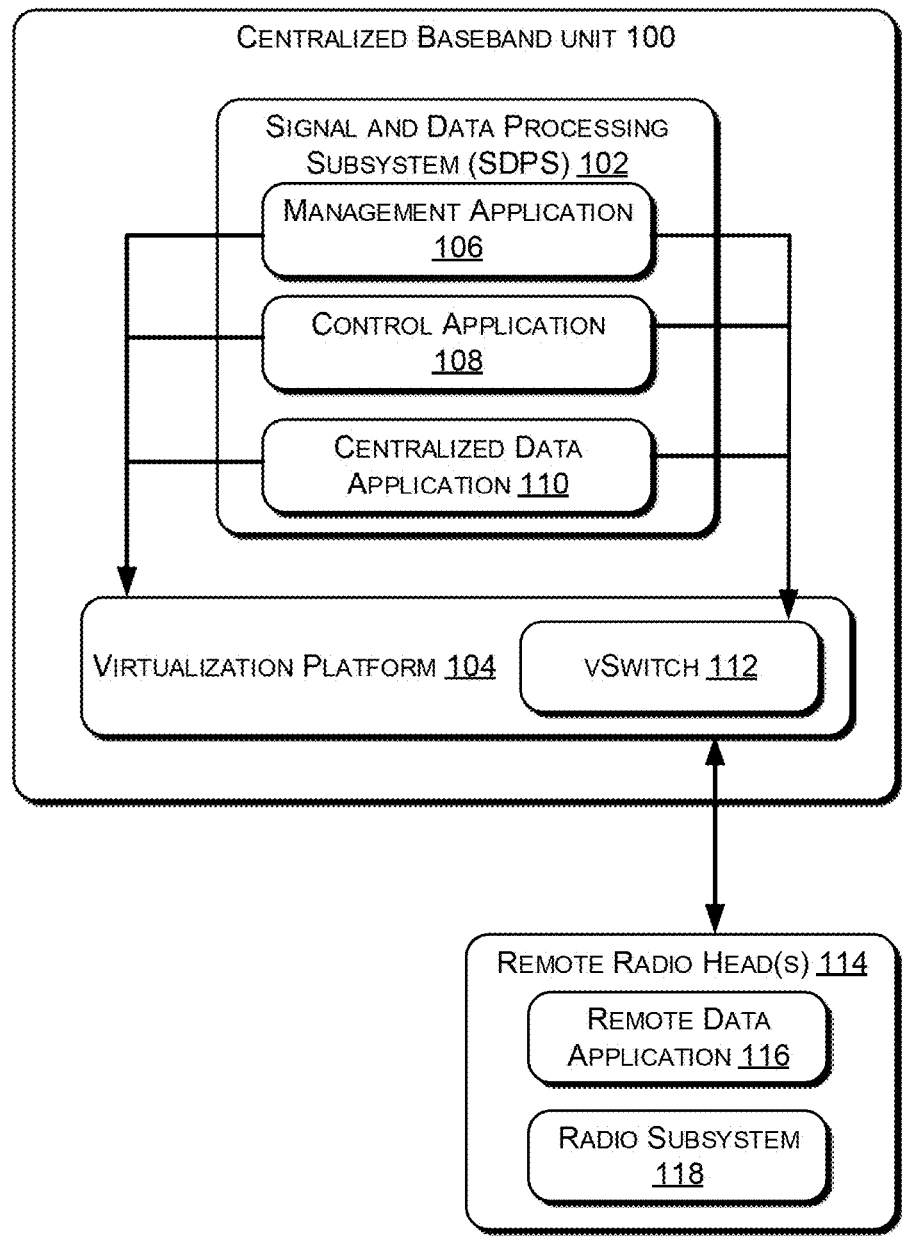
FIG. 1 illustrates a block diagram illustrating aspects of a prior art centralized baseband unit in a Cloud-Random Access Network (C-RAN).

FIG. 1 illustrates a block diagram illustrating aspects of a prior art centralized baseband unit 100 in a Cloud-Random Access Network (C-RAN).

As shown in FIG. 1, the centralized baseband unit 100 (C-BBU) comprises a Signal and Data Processing Subsystem (SDPS) 102 running on Virtualization Platform (VP) 104. The SDPS 102 comprises applications, such as Management Application (MA) 106, Control Application (CA) 108, and Centralized Data Application (CDA) 110 of a base station (BS). Typically, the CDA implements less time critical functionalities of DA in the BS. The C-BBU 100 implements Base Band Unit (BBU) of one or more cell on the virtualization platform (VP) 104 that allows multiple BS to share common resources. Further, message communication between the SDPS 102 and the VP 104 may happen through Message Communication Interface (MCI) using a vSwitch 112. Processing and computational related interactions between the SDPS 102 and the VP 104 may happen through Processing and Computational Interface (PCI).

As shown in FIG. 1, the C-BBU 100 is communicatively coupled to Remote Radio Heads(s) (RRHs) 114. The RRH comprises Remote Data Application (RDA) 116 and Radio Subsystem 118 of the BS. Typically, the RDA 116 implements time critical functionalities of the DA in the BS.

Typically, vSwitch 112 provides mechanism for message communication among the MA 106, the CA 108 and the CDA 110 of C-BBU 100 as well as access to the RRH 114 through a Common Public Radio Interface (CPRI). The SDPS 102 and the interfaces (including the CPRI) may be configured using different ports of the vSwitch 112 to make it work for the C-RAN scenario.

For scheduling packets, the vSwitch 112 maintains a flow-table having the input port (IPO), output port (OPO), Interfaces, source address (SA) and destination address (DA), actions on data (AOD), and a flow-priority (general purpose flow priority—GPFP).

As part of a vSwitch 112 configuration, a prioritized flow is created and configured to define the forwarding treatment of the received packets for same at vSwitch 112. Where the flow-priority is assigned statically during creation based on protocol components. A configured flow is scheduled by the vSwitch 112 based on the flow-priority. Based on the flow-table entries, data on a higher priority flow is scheduled before a lower priority flow.

If the vSwitch 112 is used for C-BBU 100 in C-RAN scenario, the following packet scheduling mechanism can be implemented based on the general purpose flow priority. Such scheduling mechanism is based on statically pre-configured Flow-Priority (in Flow-Table) for a set of IPO, OPO, Interface, SA, DA, etc.

In a practical scenario, packets coming for each BS is likely to have need for different priorities (packet-level-priority: PLP) to cater to different service needs (e.g. service, user priority, etc.). Also, the PLP may be dynamically vary even for same class of packets. However, the vSwitch 112 is allocating the resources based on SPGPFP and fails to take into consideration packet-level priority an individual packet. This may lead to undesired scheduling of packets impacting service quality.

Figure 2:
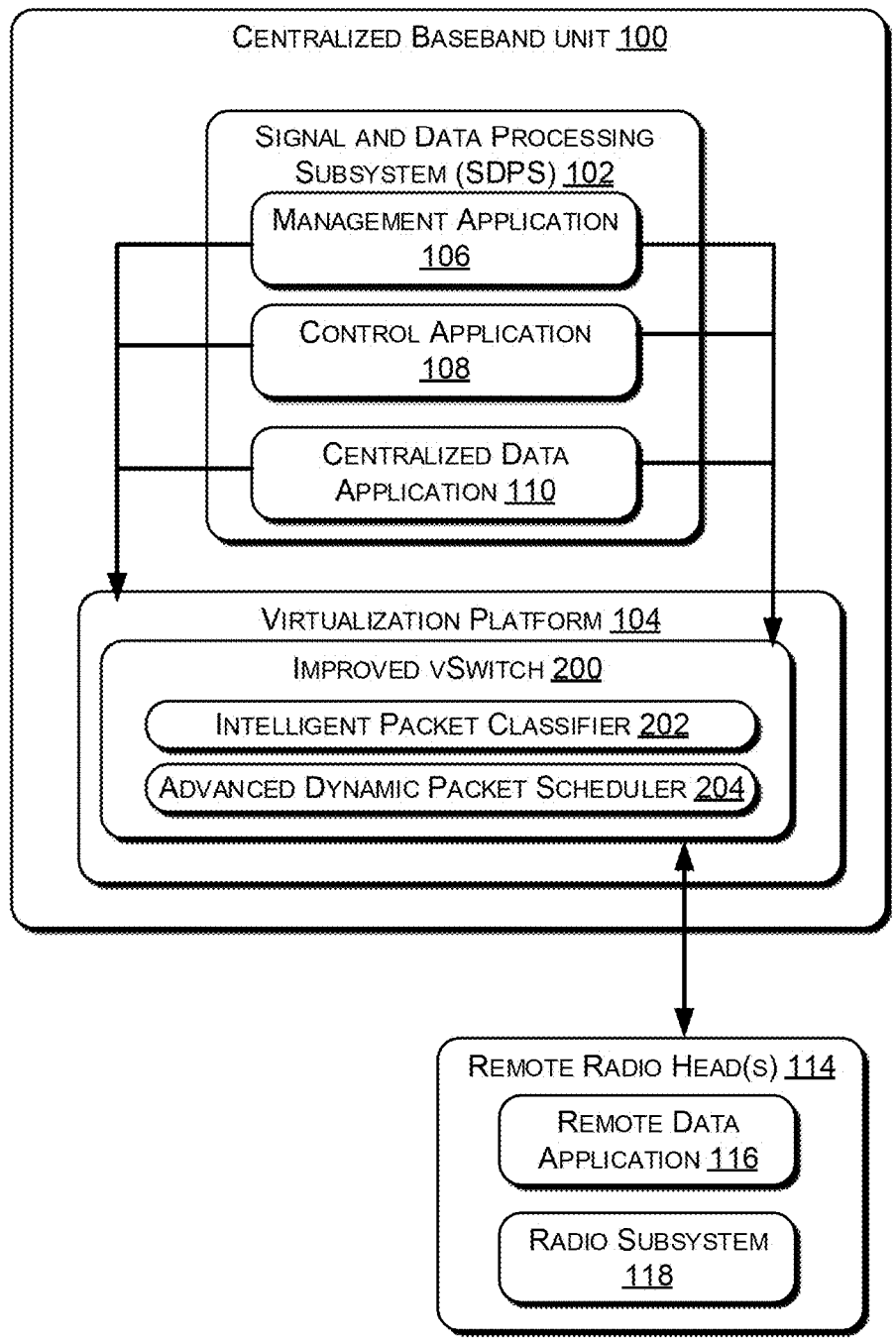
FIG. 2 illustrates a block diagram illustrating aspects of the centralized baseband unit comprising an improved vSwitch for scheduling packets, in accordance with some embodiments of present disclosure.

FIG. 2 illustrates a block diagram illustrating aspects of the centralized baseband unit 100 comprising an improved vSwitch 200 for scheduling packets, in accordance with some embodiments of present disclosure.

In some embodiments, C-BBU 100 may have similar components 102-112 as described above with regard to the prior art C-BBU 100 of FIG. 1. The C-BBU 100, however, may further include an improved vSwitch 200 comprising an intelligent packet classifier 202 and an advanced dynamic packet scheduler 204.

In operations, during system initialization is performed by Operation Administration Management (OAM) module by obtaining default of weightage values and parameters needed for packet scheduling. The intelligent packet classifier 202 may store all the configuration related parameters, such as Cell load weightage (CellLoad$_{Weightage}$) in a persistent memory.

Intelligent Packet Classification

In an example, the intelligent packet classifier 202 may receive packets from applications, such as the management application 106, the control application 108, and the centralized data application 110. Upon receiving the packets, the intelligent packet classifier 202 may analyze the packets to obtain one or more packet parameters. In an example, the packet parameters may comprise a cell priority, cell load, Inter Module Interface (IMI), a message type, and a Quality Class Identifier (QCI). Thereafter, the classifier module may compute a Dynamic-Packet-Level-Priority (DPLP) value for each of the packets based on the one or more packet parameters.

In one example, to determine the DPLP value, the intelligent packet classifier 202 may obtain a cell priority and weights associated with cells from the one or more packet parameters and compute a priority weighted score based on the cell priority and the weights. Similarly, the intelligent packet classifier 202 may calculate a load weighted score based on the cell load. Similarly, the intelligent packet classifier 202 may calculate an interface weighted score based on the IMI. Similarly, a type weighted score based on the message type. Similarly, a payload weighted score based on the QCI value upon identifying message chunks as user payload data.

Subsequently, the classifier module may compute a final score by aggregating the priority weighted score, the load weighted score, the interface weighted score, the type weighted score, and the payload weighted score. The final score may be then used by the intelligent packet classifier 202 to compute the DPLP value for each of the packets. In an example, the intelligent packet classifier 202 may identify whether the final score lies between a predefined minimum threshold value and a predefined maximum threshold value to determine the DPLP value for each of the packets.

Further, the intelligent packet classifier 202 may comprises following parameters obtained from Operation Administration Management (OAM) in the C-RAN and are used during computation of the DPLP value.

Current Cell Load (CellLoad$_{Curr}$): In the C-BBU 100, supported Cells and its present loads are given as a list for all cells, in regular interval, by the OAM.

Weightage of Cell Load (CellLoad$_{Weightage}$): This is the weightage factor to be given to CellLoad$_{Curr}$ (the cell of received packet) while calculating DPLP. This is also stored as a list for all the cells.

Current Cell Priority (CellPriority$_{Curr}$): Supported Cells and their priorities are given as a list to the improved vSwitch 200 for all cells at regular interval by the OAM.

Weightage of CP (CellPrior$_{Weightage}$): This is the weightage factor to be given to CellPriority$_{Curr}$ (the cell of received packet) while calculating the DPLP value. For all the cells CP weights are given as a list.

Cell Load and Cell Priority Update Timer (ConfigUpdate$_{time}$): In a regular interval cell list and its CellLoad$_{Curr}$ and CellPriority$_{Curr}$ are updated at the improved vSwitch 200 and this interval is denoted by ConfigUpdate$_{time}$.

Weightage of IMI (IMI$_{Weightage}$): Every received packet at vSwitch belongs to an Inter Module Interface (IMI). This value is present in a received packet. IMI$_{Weightage}$ is the weightage factor to be given to IMI type while calculating the DPLP value.

Weightage of Message Type (MT$_{Weightage}$): Any received packet at the improved vSwitch 200 has message type (MT). Value of message type is extracted from a received packet at the improved vSwitch 200. MT$_{Weightage}$ weightage factor to be given to the MT while calculating DPLP.

Weightage of QCI (QCI$_{Weightage}$): In a received packet, multiple message chunks could be present and a user payload message chunk has a QCI. QCI$_{Weightage}$ the weightage factor to be given to QCI while calculating the DPLP value.

Dynamic Packet Level Priority Bin (DynPackLevPrioBin$_j$): Final Score (FinalScore$_i$): This is a calculated value based on classifying parameters and its weightage for the i$^{th}$ packet. Number of Dynamic Packet Level Priority Bin (DynPackLevPrioBin$_{Num}$) is configured by the OAM. For j$^{th}$ Dynamic Packet Level Priority Bin (DynPackLevPrioBin$_j$), the predefined minimum threshold value (ScoreThershMin$_j$) and a predefined maximum threshold value (ScoreThershMax$_j$) are also configured by the OAM.

Based on FinalScore$_i$ each packet will be classified into DynPackLevPrioBin$_j$. DPLP$_i$ is determined by considering FinalScore$_i$ and weightage of DynPackLevPrioBin$_j$ (DynPackLevPrioBinWeightage$_j$) configured by the OAM.

Further, it may be noted that weightage and the parameters may re-configured during a configuration adaption phase.

Advance Dynamic Packet Scheduling

Once the DPLP value is determined, the advanced dynamic packet scheduler 204 may place each of the packets in priority queues based on the DPLP value. In an example, to place the packets in the priority queues, the advanced dynamic packet scheduler 204 may classifying each of the packets into a plurality of bins based on the DPLP value determined for each of the packets. Each of the plurality of bins is associated with a priority queue. The advanced dynamic packet scheduler 204 may then move the packets present in the plurality of bins to corresponding priority queues.

Thereafter, the advanced dynamic packet scheduler 204 may schedule the packets present in the priority queues based on scheduling parameters and the DPLP value. Examples of the scheduling parameters may include a queue priority value, a time slice value associated with a priority queue, and sum of the DPLP values of at least one packet from the packets in the priority queue compared to other priority queues. Further, the packets may be re-scheduled by the advanced dynamic packet scheduler 204 based on an inactivity time associated with each of the priority queues.

For dynamic configuration adaptation, the improved vSwitch 200 may determine a packet loss and a packet latency for a predefined interval of time. Thereafter, the improved vSwitch 200 may compare the packet loss and the packet latency with a packet loss threshold value and a packet latency threshold value, respectively. Based on the comparing, the improved vSwitch 200 may update the one or more packet parameters, the scheduling parameters, and the DPLP value for the dynamic configuration adaptation.

In an example, the advanced dynamic packet scheduler 204 may comprises following parameters:

No of priority queues (PrioQueue$_{Num}$): Total number of priority queues are configured by the OAM. A default value is configured at the time of system initialization. The OAM may change this value in configuration adaptation phase. PrioQueue$_{Num}$ is aligned with the DynPackLevPrioBin$_{Num}$ used for packet classification where Queue is the class of the queue.

Priority of queue (QueuePrio$_j$): QueuePrio$_j$ is the priority of the j$^{th}$ queue and it's configured by the OAM.

Inactivity time of queue (QueueInActTime$_j$): QueueInActTime is the maximum time when the jth queue is not scheduled.

CPU time slice (CTS) value of queue (QueueCpuTimeSlice$_j$): QueueCpuTimeSlice$_j$ is the CTS value of the j$^{th}$ queue defined by the OAM. Higher priority queue has high CTS value compared to a lower one. This parameter is used by scheduler on run time for scheduling a packet from queues.

Threshold on the total DPLP (QueueDPLPTh$_j$): DPLP$_{Total}$ is the cumulative DPLP$_i$ of the all the packets present in Queue$_j$. Each queue has its own QueueDPLPTh$_j$. It is compared against the DPLP$_{Total}$ of j$^{th}$ queue. This parameter is configured and controlled by the OAM and it is used for scheduling purpose.

Packet Loss and Latency Measurement Timer: (QueuePerformMonitor$_{Time}$): In a regular interval packet loss and latency are measured for PQ(S) and it is denoted by QueuePerformMonitor$_{Time}$.

Threshold of Packet Loss (QueuePktLossTh$_j$): Packet loss (QueuePktLoss$_j$): Average Packet loss per queue is monitored at each QueuePerformMonitor$_{Time}$. This is denoted by QueuePktLoss$_j$. QueuePktLossTh$_j$ is a threshold parameter of QueuePktLoss$_j$, used in the configuration adaptation phase to decide whether reconfiguration of number of queues, weightage and threshold parameters is needed.

Threshold of Packet Latency (QueuePktLatencyTh$_j$): Packet latency (QueuePktLatency$_j$): Average Packet loss per queue is monitored at each QueuePerformMonitor$_{Time}$. This is denoted by QueuePktLatency$_j$. QueuePktLatencyTh$_j$ is a threshold parameter of QueuePktLatency$_j$, used in the configuration adaptation phase to decide whether reconfiguration of number of queues, weightage and threshold parameters is needed.

Figure 3:
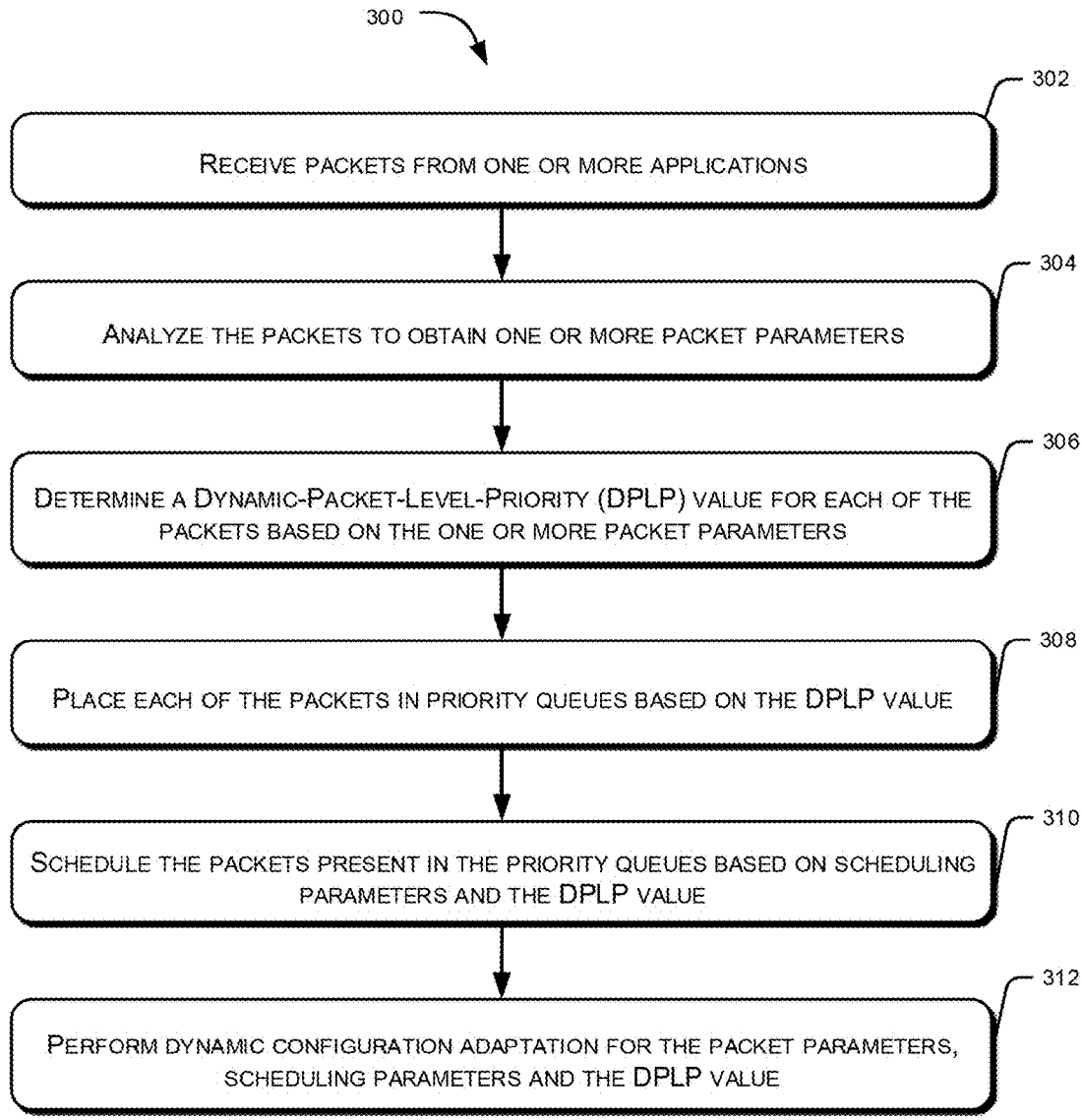
FIG. 3 illustrates an exemplary method for adaptive scheduling of packets in a wireless broadband network, in accordance with some embodiments of present disclosure.

FIG. 3 illustrates an exemplary method for adaptive scheduling of packets in a wireless broadband network, in accordance with some embodiments of present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to FIG. 3, at block 302, packets are received from applications. In an example, before receiving of the packets, the improved vSwitch 200 may perform a system initialization. For the system initialization, the vSwitch may receive configuration parameters from the OAM and store in a semi-persistent memory. Further, the improved vSwitch 200 may configures the number of queues, weights, and threshold parameters to perform effective scheduling of the packets. For example, $\text{PrioQueue}_{Num}$ and all weightage and threshold parameters are configured as part of system configuration at time of the system initialization.

Once the system initialization is performed and all the configuration parameters, weightage, and threshold parameters needed for scheduling are obtained, the intelligent packet classifier 202 may receive the packets from the applications, such as the management application 106, the control application 108, and the centralized data application 110.

At block 304, the packets are analyzed to obtain one or more packet parameters. In an example, the intelligent packet classifier 202 may analyze content of the packets to obtain the one or more packet parameters. Examples of the packet parameters may comprise a cell priority, cell load, Inter Module Interface (IMI), a message type, and a Quality Class Identifier (QCI).

At block 306, a Dynamic-Packet-Level-Priority (DPLP) value for each of the packets is determined based on the one or more packet parameters. In an example, the DPLP value is determined by the intelligent packet classifier 202 based on a priority weighted score, a load weighted score, an interface weighted score, a type weighted score, and a payload weighted score. The intelligent packet classifier 202 may compute a final score by aggregating the priority weighted score, the load weighted score, the interface weighted score, the type weighted score, and the payload weighted score. Thereafter, the intelligent packet classifier 202 may identify whether the final score lies between a predefined minimum threshold value and a predefined maximum threshold value to determine the DPLP value.

In an example, to compute the priority weighted score, the intelligent packet classifier 202 may obtain $\text{CellPriority}_{Curr\,(k)}$ and $\text{CellPrior}_{Weightage\,(k)}$ from the given list for that particular cell (e.g. $k^{th}$ cell in the list) and compute $\text{ImScore}_i$ as shown in Equation 1.

$$\text{ImScore}_i = \text{ImScore}_i + \text{CellPriority}_{Curr(k)} * \text{CellPrior}_{Weightage(k)} \qquad \text{Equation 1}$$

In an example, to compute the load weighted score, the intelligent packet classifier 202 may extract the cell from the Metadata of a received packet and obtain $\text{CellLoad}_{Curr\,(k)}$ and $\text{CellLoad}_{Weightage\,(k)}$ from the given list for that particular cell (e.g. $k^{th}$ cell in the list). Thereafter, the intelligent packet classifier 202 may compute $\text{ImScore}_i$ as shown in Equation 2.

$$\text{ImScore}_i = \text{ImScore}_i + \text{CellLoad}_{Curr(k)} * \text{CellLoad}_{Weightage(k)} \qquad \text{Equation 2}$$

$\text{ImScore}_i$ is an intermediate calculated score for each classifying parameter with its weightage, this score is be added up in each step of classification ($i^{th}$ packet in received packets)

In an example, to compute the interface weighted score, the intelligent packet classifier 202 may extract the $\text{IMI}_{(k)}$ from the received packet and obtain the corresponding $\text{IMI}_{Weightage\,(k)}$ (e.g. $k^{th}$ interface in the list). Then, the classifier module may calculate the intermediate calculated score $\text{ImScore}_i$, i.e., the interface weighted score for the IMI as shown in Equation 3.

$$\text{ImScore}_i = \text{ImScore}_i + \text{IMI}_{(k)} * \text{IMI}_{Weightage(k)} \qquad \text{Equation 3}$$

Further, to compute the type weighted score, the intelligent packet classifier 202 may extract the $\text{MT}_{(k)}$ from $\text{MsgChunk}_n$ and obtain the corresponding $\text{MT}_{Weightage\,(k)}$ (e.g. $k^{th}$ message type in the list). It may be noted that $\text{MsgChunk}_n$ stands for $n^{th}$ message chunk in a received packet and MsgChunkNum stands for Total number of message chunks in a received packet. The classifier module may then compute the type weighted score, also referred to as $\text{ImScore}_i$ for the MT as shown in Equation 4.

$$\text{ImScore} = \text{ImScore}_i + \text{MT}_{(k)(n)} * \text{MT}_{Weightage(k)(n)} \qquad \text{Equation 4}$$

Further, to compute the payload weighted score, the intelligent packet classifier 202 may check whether the message type is user payload. In case the $\text{MsgChunk}_n$ is a user payload data, then the ImScore score will be computed again. The intelligent packet classifier 202 may extract the QCI (k) from $\text{MsgChunk}_n$ and obtain the corresponding $\text{QCIWeightage}_{(k)}$ (e.g. kth QCI in the list) to compute the payload weighted score referred to as $\text{ImScore}_i$ for the QCI as shown in Equation 5.

$$\text{ImScore}_i = \text{ImScore}_i + \text{QCI}_{(k)(n)} * \text{QCIWeightage}_{(k)(n)} \qquad \text{Equation 4}$$

Upon determining the payload weighted score or identifying that the $\text{MsgChunk}_n$ is not the user payload data, the intelligent packet classifier 202 may check whether last message chunk is present inside the packet. If the intelligent packet classifier 202 identifies that the last message chunk is present, the intelligent packet classifier 202 may proceed to computation of the final score. Else, the intelligent packet classifier 202 may repeat the computation of the type weighted score and the payload weighted score.

Once the type weighted score and the payload weighted score are obtained, the intelligent packet classifier 202 may compute the final score for each of the packets by aggregating all the intermediate scores obtained for all the packet parameters, i.e., the priority weighted score, the load weighted score, the interface weighted score, the type weighted score, and the payload weighted score.

Thereafter, to calculate the DPLP value for each of the packets, the intelligent packet classifier 202 may compare the final score $\text{FinalScore}_i$ with the predefined minimum threshold value $\text{ScoreThershMin}_j$ and the predefined maximum threshold value $\text{ScoreThershMax}_j$ of $\text{DynPackLevPrioBin}_j$ (S).

If $\text{FinalScore}_i$ is falling in a range of $\text{ScoreThershMin}_j$ and $\text{ScoreThershMax}_j$ of a $\text{DynPackLevPrioBin}_j$, then the intelligent packet classifier 202 may compute the $\text{DPLP}_i$ of received $i^{th}$ packet as shown in Equation 5.

$$\text{DPLP}_i = \text{FinalScore}_i * \text{DynPackLevPrioBinWeightage}_j \qquad \text{Equation 5}$$

At block 308, each of the packets are placed in priority queues based on the DPLP value. In an example, the advanced dynamic packet scheduler 204 may place the packets in the priority queues $\text{Queue}_j$ based on the DPLP value. To place the packets into the queues $Queue_j$, the advanced dynamic packet scheduler 204 may classify each of the packets into a plurality of bins $DynPackLevPrioBin_j$ based on the DPLP value determined for each of the packets. It may be noted that each of the plurality of bins is associated with a priority queue. Once the packets are classified into bins $DynPackLevPrioBin_j$, the advanced dynamic packet scheduler 204 may move the packets present in the plurality of bins to corresponding priority queues $Queue_j$.

At block 310, scheduling the packets present in the priority queues based on scheduling parameters and the DPLP value. In an example, the advanced dynamic packet scheduler 204 may schedule the packets based on the scheduling parameters and the DPLP value. Examples of the scheduling parameters may include a queue priority value, a time slice value associated with a priority queue, and sum of the DPLP values of at least one packet from the packets in the priority queue compared to other priority queues.

In an example, to schedule the packets, the advanced dynamic packet scheduler 204 may follow the flow provided below.

Calculate cumulative DPLP of a queue as below:

$$DPLP_{Total(j)} = \Sigma DPLP_{i(j)}$$

For j=k:
Step 1. Schedule packets of $Queue_k$ for $QueueCpuTimeSlice_k$
Step 2. If $DPLP_{Total\ (m)} > QueueDPLPTh_m$
Schedule packets of $Queue_m$ for $QueueCpuTimeSlice_m$
Else,
Schedule packets of $Queue_{k+1}$ for $QueueCpuTimeSlice_{k+1}$
Step 3. Repeat step 1 to 2 for j=0 to $PrioQueue_{Num}$ Further, in case one of the queues in inactive for more than a predefined time, the advanced dynamic packet scheduler 204 may reschedule the packets present in the priority queues based on an inactivity time associated with each of the priority queues. In this manner, the packets are scheduled by the improved vSwitch 200 in the C-RAN.

At block 312, dynamic configuration adaptation is performed for packet parameters, the scheduling parameters and the DPLP values. In an example, the packet parameters and the scheduling parameters are reconfigured by the OAM and then received by the improved vSwitch 200. Thereafter, the improved vSwitch 200 may update the packet parameters and the scheduling parameters in the persistent memory. Further, the improved vSwitch 200 may compute the DPLP value again based on the packet parameters and the scheduling parameters, and update the DPLP value in the persistent memory.

In an example, to perform the dynamic configuration adaptation, the advanced dynamic packet scheduler 204 may a packet loss and a packet latency for a predefined interval of time. Subsequently, the advanced dynamic packet scheduler 204 may compare the packet loss with a packet loss threshold value and the packet latency with a packet latency threshold value. If any of the packet loss and the packet latency go beyond the packet loss threshold value and packet latency threshold value, respectively, the advanced dynamic packet scheduler 204 communicate the same to the OAM. The OAM may then re-configure parameters that required to minimize the packet loss and the packet latency. In case, reconfiguration of parameters is performed, the v-Switch may receive the update parameters from the OAM and update the one or more packet parameters, the scheduling parameters, and the DPLP value for dynamic configuration adaptation.

Computer System

Figure 4:
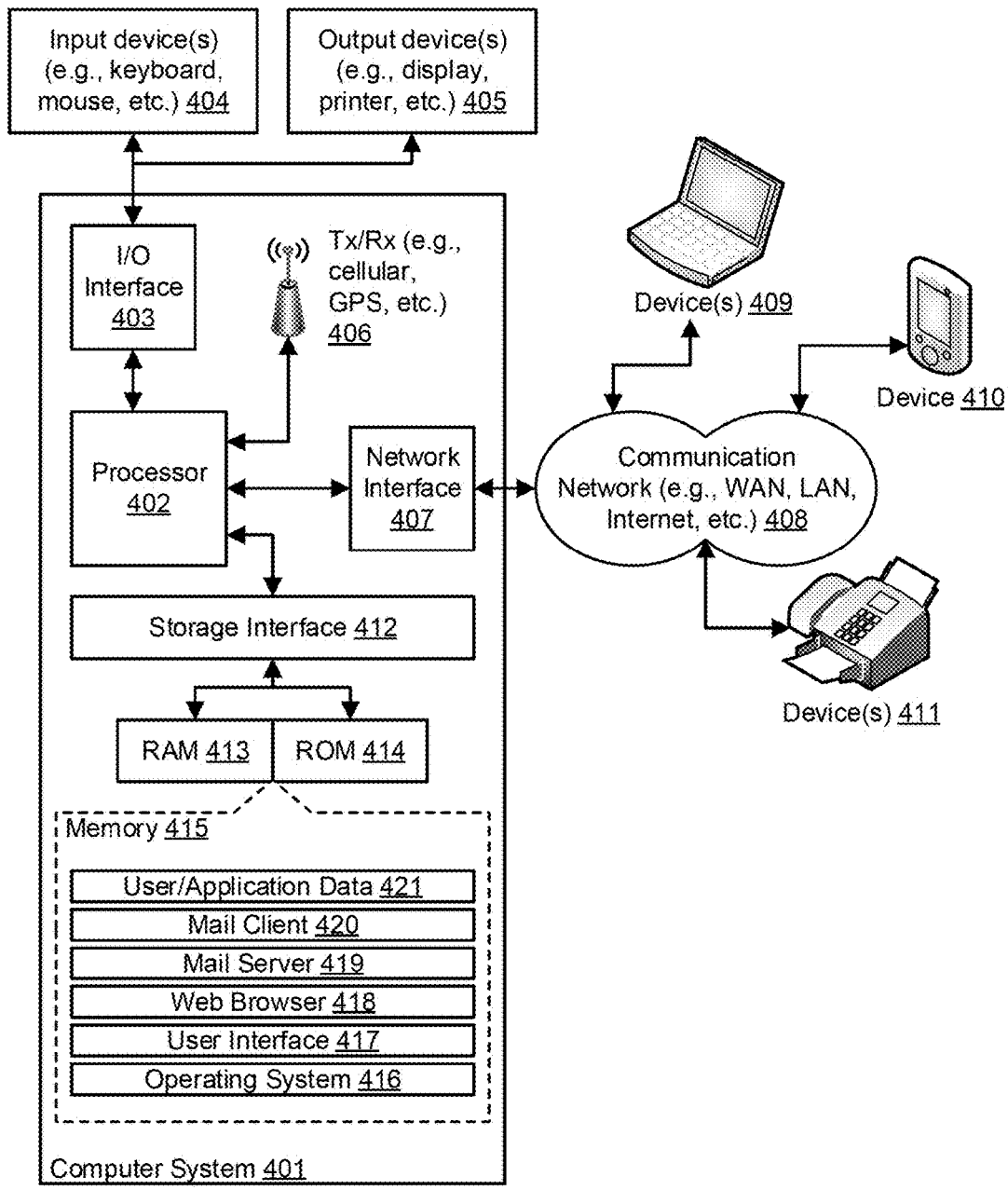
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the devices and systems disclosed herein. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for adaptive scheduling of packets in a wireless broadband network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for adaptive scheduling of packets in a wireless broadband network; comprising:
   a hardware processor; and
   a memory storing instructions executable by the hardware processor to perform operations comprising:
   receiving, via the hardware processor, the packets from applications;
   analyzing, via the hardware processor, the packets to obtain one or more packet parameters;
   determining, via the hardware processor, a Dynamic-Packet-Level-Priority (DPLP) value for each of the packets based on the one or more packet parameters;
   placing, via the hardware processor, each of the packets in priority queues based on the DPLP value;
   scheduling, via the hardware processor, the packets present in the priority queues based on scheduling parameters and the DPLP value;
   determining a packet loss and a packet latency for a predefined interval of time;
   comparing the packet loss with a packet loss threshold value and the packet latency with a packet latency threshold value; and
   updating the one or more packet parameters, the scheduling parameters, and the DPLP value based on the comparing for dynamic configuration adaptation.

2. The system of claim 1, wherein the wireless broadband network is a Cloud-Radio Access Network (C-RAN).

3. The system of claim 1, wherein the one or more packet parameters comprises at least one of a cell priority, cell load, Inter Module Interface (IMI), a message type, and a Quality Class Identifier (QCI).

4. The system of claim 3, wherein determining, via the hardware processor, the DPLP value for each of the packets further comprises:
   calculating a priority weighted score based on the cell priority;
   calculating a load weighted score based on the cell load;
   calculating an interface weighted score based on the Inter Module Interface (IMI);
   calculating a type weighted score based on the message type;
   calculating a payload weighted score based on the QCI value upon identifying message chunks as user payload data;
   computing a final score by aggregating the priority weighted score, the load weighted score, the interface weighted score, the type weighted score, and the payload weighted score; and
   identifying whether the final score lies between a predefined minimum threshold value and a predefined maximum threshold value to determine the DPLP value.

5. The system of claim 1, wherein placing, via the hardware processor, each of the packets based on the DPLP value further comprises:
   classifying each of the packets into a plurality of bins based on the DPLP value determined for each of the packets, wherein each of the plurality of bins is associated with a priority queue; and
   moving the packets present in the plurality of bins to corresponding priority queues.

6. The system of claim 1, wherein the scheduling parameters comprises at least one of a queue priority value, a time slice value associated with a priority queue, and sum of the DPLP values of at least one packet from the packets in the priority queue compared to other priority queues.

7. The system of claim 1, wherein scheduling, via the hardware processor, the packets present in the priority queues further comprises rescheduling the packets present in the priority queues based on an inactivity time associated with each of the priority queues.

8. A method for adaptive scheduling of packets in a wireless broadband network, comprising:
   receiving, via a hardware processor, the packets from applications;
   analyzing, via the hardware processor, the packets to obtain one or more packet parameters;
   determining, via the hardware processor, a Dynamic-Packet-Level-Priority (DPLP) value for each of the packets based on the one or more packet parameters;
   placing, via the hardware processor, each of the packets n priority queues based on the DPLP value;
   scheduling, via the hardware processor, the packets present in the priority queues based on scheduling parameters and the DPLP value;
   determining a packet loss and a packet latency for a predefined interval of time;
   comparing the packet loss with a packet loss threshold value and the packet latency with a packet latency threshold value; and
   updating the one or more packet parameters, the scheduling parameters, and the DPLP value based on the comparing for dynamic configuration adaptation.

9. The method as claimed in claim 8, wherein the wireless broadband network is a Cloud-Radio Access Network (C-RAN).

10. The method as claimed in claim 8, wherein the one or more packet parameters comprises at least one of a cell priority, cell load, Inter Module Interface (IMI), a message type, and a Quality Class Identifier (QCI).

11. The method as claimed in claim 10, wherein determining, via the hardware processor, the DPLP value for each of the packets further comprises:
   calculating a priority weighted score based on the cell priority;
   calculating a load weighted score based on the cell load;
   calculating an interface weighted score based on the Inter Module Interface (IMI);
   calculating a type weighted score based on the message type;
   calculating a payload weighted score based on the QCI value upon identifying message chunks as user payload data;
   computing a final score by aggregating the priority weighted score, the load weighted score, the interface weighted score, the type weighted score, and the payload weighted score; and
   identifying whether the final score lies between a predefined minimum threshold value and a predefined maximum threshold value to determine the DPLP value.

12. The method as claimed in claim 8, wherein placing, via the hardware processor, each of the packets based on the DPLP value further comprises:

classifying each of the packets into a plurality of bins based on the DPLP value determined for each of the packets, wherein each of the plurality of bins is associated with a priority queue; and moving the packets present in the plurality of bins to corresponding priority queues.

13. The method as claimed in claim 8, wherein the scheduling parameters comprises at least one of a queue priority value, a time slice value associated with a priority queue, and sum of the DPLP values of at least one packet from the packets in the priority queue compared to other priority queues.

14. The method as claimed in claim 8, wherein scheduling, via the hardware processor, the packets present in the priority queues further comprises rescheduling the packets present in the priority queues based on an inactivity time associated with each of the priority queues.

15. A non-transitory computer-readable medium storing processor-executable instructions for adaptive scheduling of packets in a wireless broadband network, the instructions comprising instructions for:

receiving, via the hardware processor, the packets from applications;

analyzing, via the hardware processor, the packets to obtain one or more packet parameters;

determining, via the hardware processor; a Dynamic-Packet-Level-Priority (DPLP) value for each of the packets based on the one or more packet;

placing, via the hardware processor; each of the packets in priority queues based on the DPLP value;

scheduling; via the hardware processor, the packets present in the priority queues based on scheduling parameters and the DPLP value;

determining a packet loss and a packet latency for a predefined interval of time;

comparing the packet loss with a packet loss threshold value and the packet latency with a packet latency threshold value; and updating the one or more packet parameters, the scheduling parameters, and the DPLP value based on the comparing for dynamic configuration adaptation.

16. The non-transitory computer-readable medium as claimed in claim 15, wherein the wireless broadband network is a Cloud-Radio Access Network (C-RAN).

17. The non-transitory computer-readable medium as claimed in claim 15, wherein the one or more packet parameters comprises at least one of a cell priority, cell load, Inter Module Interface (IMI), a message type, and a Quality Class Identifier (QCI).

18. The non-transitory computer-readable medium as claimed in claim 17, wherein determining, via the hardware processor, the DPLP value for each of the packets further comprises:

calculating a priority weighted score based on the cell priority;

calculating a load weighted score based on the cell load;

calculating an interface weighted score based on the Inter Module Interface (IMI);

calculating a type weighted score based on the message type;

calculating a payload weighted score based on the QCI value upon identifying message chunks as user payload data;

computing a final score by aggregating the priority weighted score, the load weighted score, the interface weighted score, the type weighted score, and the payload weighted score; and identifying whether the final score lies between a predefined minimum threshold value and a predefined maximum threshold value to determine the DPLP value.

19. The non-transitory computer-readable medium as claimed in claim 15, wherein placing, via the hardware processor, each of the packets based on the DPLP value further comprises:

classifying each of the packets into a plurality of bins based on the DPLP value determined for each of the packets, wherein each of the plurality of bins is associated with a priority queue; and moving the packets present in the plurality of bins to corresponding priority queues.

20. The non-transitory computer-readable medium as claimed in claim 15, wherein the scheduling parameters comprises at least one of a queue priority value, a time slice value associated with a priority queue, and sum of the DPLP values of at least one packet from the packets in the priority queue compared to other priority queues.

21. The non-transitory computer-readable medium as claimed in claim 15, wherein scheduling, via the hardware processor, the packets present in the priority queues further comprises rescheduling the packets present in the priority queues based on an inactivity time associated with each of the priority queues.

* * * * *

UNITED STATES PATENT AND TRADEMARK OFFICE
CERTIFICATE OF CORRECTION

PATENT NO. : 10,057,915 B2
APPLICATION NO. : 15/086820
DATED : August 21, 2018
INVENTOR(S) : Saptarshi Chaudhuri et al.

Page 1 of 1

It is certified that error appears in the above-identified patent and that said Letters Patent is hereby corrected as shown below:

In the Claims

Claim 8, Column 14, Lines 24-25, "packets n priority queues" should read -- packets in priority queues --.

Signed and Sealed this
Thirtieth Day of October, 2018

Andrei Iancu
*Director of the United States Patent and Trademark Office*